(No Model.) 2 Sheets—Sheet 1.

H. H. WING.
ROTARY DRIER.

No. 603,355. Patented May 3, 1898.

Witnesses, Herbert H. Wing. Inventor.

By James Sangster Attorney.

(No Model.) 2 Sheets—Sheet 2.

H. H. WING.
ROTARY DRIER.

No. 603,355. Patented May 3, 1898.

Witnesses, Herbert H. Wing. Inventor.

By James Sangster, Attorney.

UNITED STATES PATENT OFFICE.

HERBERT H. WING, OF BUFFALO, NEW YORK.

ROTARY DRIER.

SPECIFICATION forming part of Letters Patent No. 603,355, dated May 3, 1898.

Application filed March 8, 1897. Serial No. 626,431. (No model.)

*To all whom it may concern:*

Be it known that I, HERBERT H. WING, a citizen of the United States, residing at Buffalo, in the county of Erie and State of New York, have invented certain new and useful Improvements in Rotary Driers, of which the following is a specification.

My invention relates to an improved rotary drier chiefly applicable to certain classes of products which require complete isolation from the injurious gases of combustion.

It also relates to certain details of construction, all of which will be fully and clearly hereinafter described and claimed, reference being had to the accompanying drawings, in which—

Figure 1:
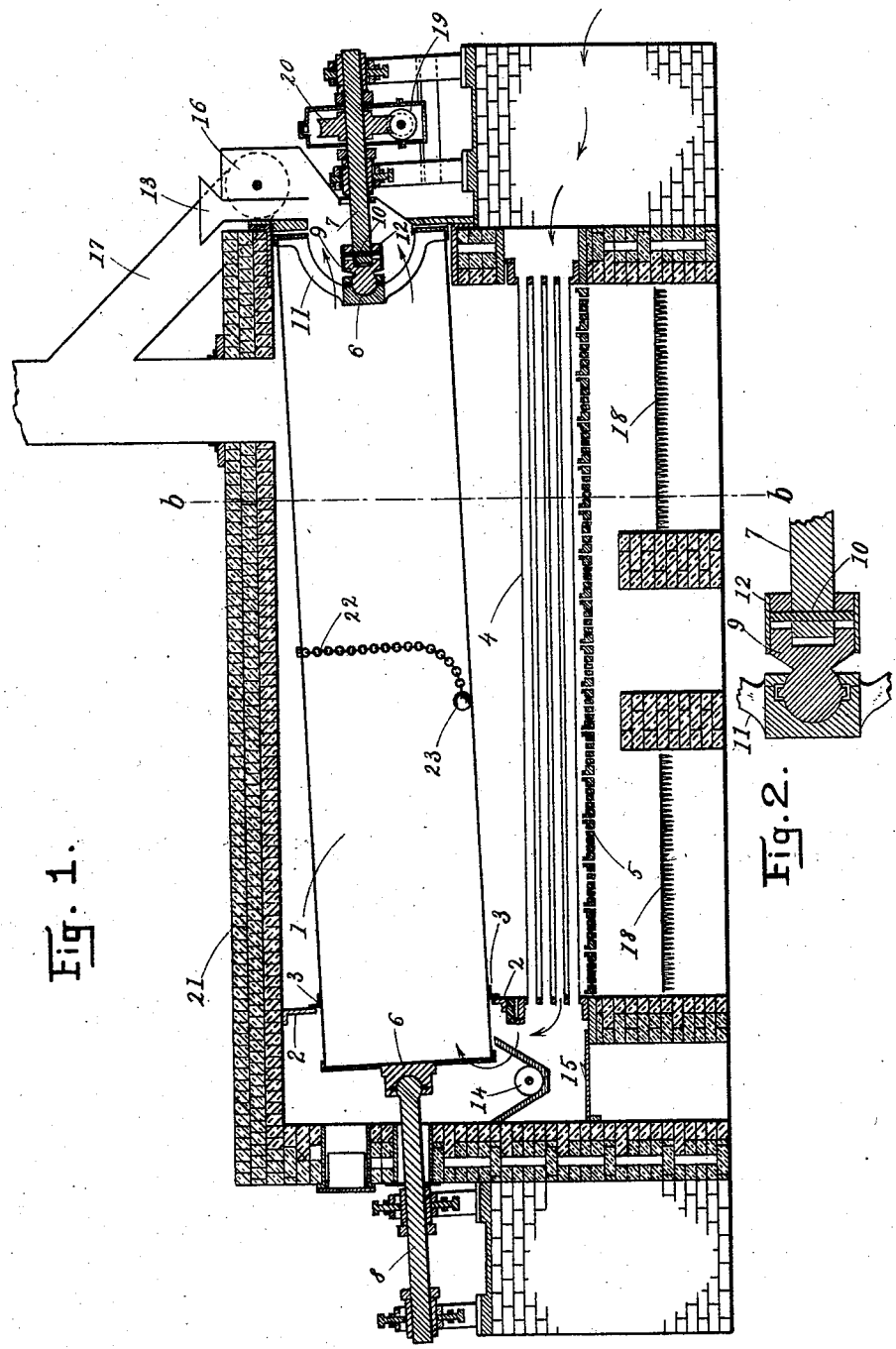
Figure 2:
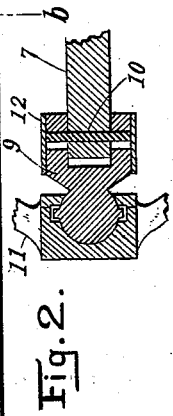
Figure 3:
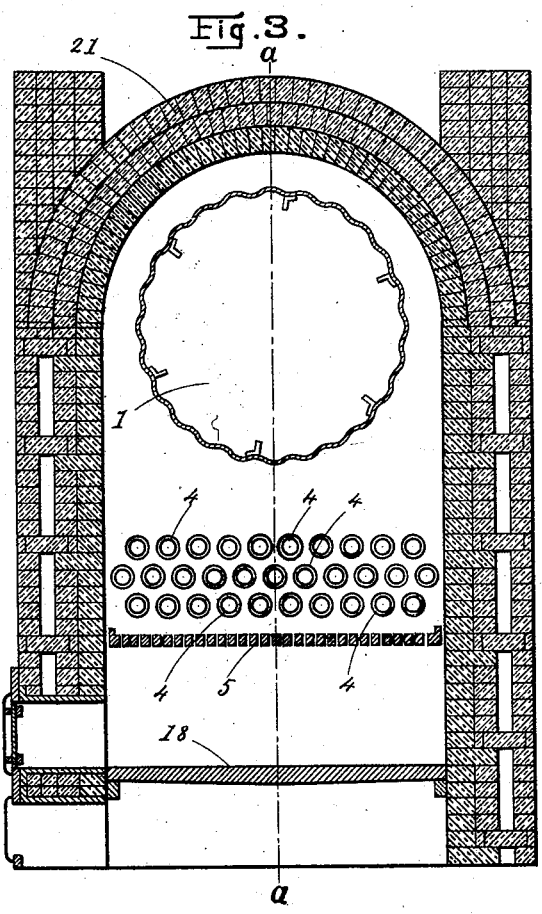
Figure 4:
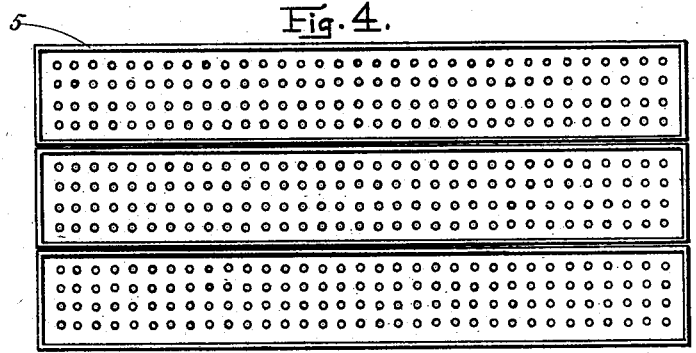

Figure 1 represents a central longitudinal section through my improved drier on or about line *a a*, Fig. 3. Fig. 2 represents an enlarged detached central section through one of the universal and expansion joints. Fig. 3 represents a cross-section on or about line *b b*, Fig. 1. Fig. 4 represents a detached plan view of three sections of the perforated diaphragm.

When it has been desired to dry certain kinds of material—such as food products, chemicals, &c.—in a mechanical drier, it is not possible to use the heat of combustion-gases by bringing them in direct contact with the material to be dried, so that heretofore mechanical driers to accomplish the drying of products which would be injured by contact with combustion-gases have been constructed in such a manner as to occupy a very large space and the amount of fuel correspondingly large for the results obtained. Other forms of driers to accomplish such results employ the use of steam for heating the radiating and heating surfaces, and by this means are able to dry materials and not expose the materials being dried to the action of combustion-gases.

In my improved style of mechanical drier I am able to accomplish the drying in a very economical manner, and at the same time the drier is very compact, requiring a comparatively small space compared to its capacity. In order to obtain the economical results in the consumption of fuel for evaporating the moisture in the material being dried or for heating or roasting it, as the occasion requires, the direct heat of the combustion-gases is allowed to heat the outside of the rotary shell 1, but is prevented from entering the inside of the cylinder by means of partitions 2, with closely-fitting rings 3, which completely separate the two spaces. By this arrangement it is possible to heat the rotary shell to any desired temperature and with the consumption of less fuel than by any indirect method. In order to accomplish the rapid drying and still further increase the capacity of the drier, I obtain by a very simple and compact arrangement means for circulating through the interior of the rotary shell a large volume of pure air which is heated to any desired temperature. This result is accomplished by the use of a number of pipes 4, placed in the same chamber in which the rotary shell is placed and which are comparatively close to the source of heat.

As the economy of using the direct heat of combustion-gases is dependent upon utilizing them at the highest temperatures which is possible without injuring the materials of construction and in so distributing this high heat that it can be regulated and employed in close proximity to the materials to be heated, calcined, or roasted, I am able, by means of the perforated cast-iron-plate diaphragm 5, which is located between the fire on the grates and the hot-air pipes 4, as well as the rotary shell or cylinder 1, to utilize the heat of the fire to the greatest economy, as the heating-gases are reduced to a uniform temperature by passing through these perforated cast-iron plates 5, and as these gases are of a uniform temperature no injury to the materials of construction or material being dried occurs, while the great advantage of the use of the high-temperature gases makes it possible to obtain highly-heated pure air for circulating through the cylinder, as well as of securing a high but uniform heat on the rotary shell, and as this heat can be very successfully regulated by the regulation of the drafts of the fire it is possible to do the work with less fuel, besides accomplishing a given amount of work in a much smaller space.

In order to still further increase the capacity of a given-sized machine and, as the capacity of a given-sized shell of this style of drier is dependent upon the area of heating-surface, in order to increase the area of the shell without increasing the size of the machine, I make the rotary shell corrugated. (See Fig. 2.) The corrugations can be made to run any way it may be desired, depending upon the nature of the material being dried, roasted, or calcined.

Another advantage derived from the corrugated cylinder is that the jarring device, one form of which is shown in Fig. 1 and which consists of a ball 23, attached to the interior of said cylinder by means of a chain 22, receives an increased effect due to the ball striking several places, giving a number of jars in a single fall by means of striking the corrugations of the surface of the shell.

In order to support and rotate the shell, I prefer to use the construction shown in Fig. 1, which consists in using a universal joint 6 with a limited motion, as by this arrangement I obtain a flexible connection between the supporting-shafts 7 and 8 and the rotary shell 1, so that there is no liability of any binding occurring in case the two supporting-shafts 7 and 8 are not kept in line, as by this arrangement the shell will rotate as easily with the two supporting-shafts out of line as if they were in line.

In order to allow for the expansion and contraction of the rotary shell, I provide an arrangement shown in Fig. 1, which consists in having the upper shaft 7 slide in a collar 9, which forms part of the ball of the universal joint. The pin 10, which extends through the collar 9 and shaft 7, transmits the power from the said shaft to the said collar and from thence to the spider 11, which is rigidly secured to the rotary shell.

The sleeve 12 prevents any material getting into the space which represents the limit of the expansion of the rotary shell.

The construction and operation of the drier can be understood by reference to the accompanying drawings and the foregoing description, in which like figures refer to like parts.

The material which is to be dried, heated, roasted, or calcined passes through the rotary shell 1, having first been fed into the hopper 13. After passing through the said cylinder or shell 1 it is discharged into the conveyer 14, located in the partitioned chamber 15, from whence it is conveyed to any desired locality.

The hot air obtained for circulating through the cylinder 1 is drawn, by means of the suction-fan 16, located in the stack 17, through the pipes 4, which are uniformly heated to a high temperature by the hot combustion-gases, which are reduced to a uniform temperature by passing through the perforated cast-iron-plate diaphragm 5.

The fire is located on the grates 18, which are placed below the perforated cast-iron-plate diaphragm 5.

The shell is rotated by any suitable means, preferably a worm 19 and worm-wheel mechanism 20, which can be located on either shaft.

The supporting and inclosing walls 21 are preferably built, in the usual manner, of brick; but any suitable material may be used.

I claim as my invention—

1. In a drying apparatus, the combination of a rotary drying-shell mounted in suitable bearings, a furnace, a series of air-circulating pipes located near said drying-shell, a perforated metal diaphragm located between said pipes and the furnace, and means for rotating said drying-shell.

2. In a rotary drying apparatus, the combination of a rotary drying-shell, means for rotating it, means for insulating the interior of the drying-shell from the products of combustion, a series of air-circulating pipes communicating with the rotary shell and the outside air having their interiors insulated from the surrounding products of combustion, and a perforated metal diaphragm located between said air-circulating pipes and the combustion-chamber.

3. In a drying apparatus, a rotary drying-shell connected to its supporting and operating shafting by an expansible universal joint.

4. In a drying apparatus, an inclosed rotary drying-shell having its greatest length exposed to the furnace-chamber and in open communication with a chamber separated from the furnace-chamber, and communicating with radiating-pipes which pass through said furnace-chamber and are in open communication with the air outside of said drying apparatus and a perforated metal diaphragm located between said radiating-pipes and the source of heat.

HERBERT H. WING.

Witnesses:
 JAMES SANGSTER,
 L. M. SPONG.